US008777738B2

(12) United States Patent
Nelson et al.

(10) Patent No.: US 8,777,738 B2

(45) Date of Patent: Jul. 15, 2014

(54) SYSTEM AND METHOD FOR AN EXTENSIBLE BOOT IMAGE FOR ELECTRONIC GAMING MACHINES

(75) Inventors: Kenneth Nelson, Henderson, NV (US); Daryn Kiely, Henderson, NV (US); Dwayne R. Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 13/330,353

(22) Filed: Dec. 19, 2011

(65) Prior Publication Data

US 2013/0084932 A1 Apr. 4, 2013

Related U.S. Application Data

(60) Provisional application No. 61/541,497, filed on Sep. 30, 2011.

(51) Int. Cl.
*G06F 17/00* (2006.01)
*A63F 13/00* (2014.01)

(52) U.S. Cl.
USPC .................... 463/29; 463/25; 463/42; 463/43

(58) Field of Classification Search
USPC ...................................... 463/1, 29, 42–43, 46
See application file for complete search history.

(56) References Cited

U.S. PATENT DOCUMENTS

2003/0203756 A1* 10/2003 Jackson .......................... 463/42
2003/0216172 A1* 11/2003 LeMay et al. ................... 463/29
2004/0259643 A1* 12/2004 Gentles ........................... 463/43
2004/0266533 A1* 12/2004 Gentles et al. .................. 463/42
2005/0143171 A1* 6/2005 Loose ............................. 463/29
2006/0063575 A1* 3/2006 Gatto et al. ........................ 463/1
2006/0205514 A1* 9/2006 Cockerille et al. .............. 463/43
2006/0287108 A1* 12/2006 Canterbury ..................... 463/43
2007/0129150 A1* 6/2007 Crowder et al. ................ 463/46
2009/0247293 A1* 10/2009 Lenger ............................ 463/29
2010/0075762 A1* 3/2010 Comes et al. ................... 463/44
2011/0078347 A1* 3/2011 Hamid ............................ 710/63
2012/0208619 A1* 8/2012 Canterbury et al. ............ 463/25

OTHER PUBLICATIONS

NRS, Chapter 463—Licensing and Control of Gaming, 2001, https://www.leg.state.nv.us/NRS/NRS-463.html.*
James Hodl, Powering the New Slot Floor, Jun. 19, 2007, http://www.casinojournal.com/Archives_Davinci?article=2483.*

* cited by examiner

*Primary Examiner* — Dmitry Suhol
*Assistant Examiner* — Jason Yen
(74) *Attorney, Agent, or Firm* — Foley & Lardner LLP

(57) ABSTRACT

Disclosed are electronic gaming machines, methods and systems for gaming device configuration and gaming device software distribution. An electronic gaming machine is configured to detect whether a primary portable storage device is in communication with the electronic gaming machine. The primary portable storage device may be configured to store a boot image. The boot image may include a boot code, an operating system, and a framework application. The framework application may be configured to search and execute a pluggable module according to instructions provided by the pluggable module. The framework application may also include instructions configured to determine whether at least one of the one or more pluggable modules includes a signature and execute the at least one pluggable module when it is determined that the at least one pluggable module includes the signature.

16 Claims, 7 Drawing Sheets

SYSTEM AND METHOD FOR AN EXTENSIBLE BOOT IMAGE FOR ELECTRONIC GAMING MACHINES

PRIORITY AND RELATED APPLICATION DATA

This application claims priority to U.S. Provisional Patent Application No. 61/541,497, filed on Sep. 30, 2011, titled “System and Method for an Extensible Boot Image for Electronic Gaming Machines,” by Kenneth Nelson et. al., which is incorporated herein by reference in its entirety and for all purposes.

TECHNICAL FIELD

The present disclosure relates generally to wager-based gaming machines, and more specifically to gaming device configuration and gaming device software distribution.

BACKGROUND

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

SUMMARY

Various embodiments described or referenced herein are directed to different devices, methods and systems for gaming software configuration and distribution. In some embodiments, the gaming machine, methods and systems may be configured or designed for use in a casino environment.

In one aspect, the invention features an electronic gaming machine that may include an input device configured to receive an indication of value for play of a wager-based game in which one or more game outcomes can be provided responsive to a wager. The electronic gaming machine may also include an output device configured to output an indication of value in association with play of the wager-based game. The electronic gaming machine may also include a display configured to display data associated with the wager-based game. The electronic gaming machine may further include a network interface configured to communicate with a remote host. The electronic gaming machine may also include one or more processors. The one or more processors may be configured to detect whether a primary portable storage device is in communication with the electronic gaming machine. The primary portable storage device may be configured to store a boot image. The boot image may include a boot code, an operating system and a framework application. The boot code may have instructions for execution by the one or more processors when the electronic gaming machine is powered up. The operating system may include software instructions for managing hardware and executing software applications at the electronic gaming machine. The operating system may also be approved by a regulatory gaming authority. The framework application may be configured to search and execute a pluggable module according to instructions provided by the pluggable module. The framework application may include instructions configured to identify one or more storage devices other than the primary portable storage device. The one or more storage devices may be configured to store one or more pluggable modules. The framework application may also include instructions configured to determine whether at least one of the one or more pluggable modules includes a signature. The signature can indicate that a pluggable module is operable within the framework application and that the framework application is approved by the regulatory gaming authority. The framework application may also include instructions configured to execute the at least one pluggable module according to instructions provided by the at least one pluggable module when it is determined that the at least one pluggable module includes the signature. The one or more processors may be further configured to determine whether the boot image is a signed image. The signed image may be required by the regulatory gaming authority to establish a chain of trust. The one or more processors may be further configured to execute the framework application on the primary portable storage device when it is determined that the boot image is a signed image.

In various implementations of the invention, the boot image may be required to be signed and approved by the regulatory gaming authority to modify the boot image. The boot image may also require a new signature and approval by the regulatory gaming authority when the operating system is modified. The boot image may require a new signature and approval by the regulatory gaming authority when the framework application is modified. The one or more storage devices may be a storage device of the electronic gaming machine, a secondary portable device or a remote host.

In various implementations of the invention, the framework application is further configured to select a pluggable module based on a parameter. The parameter may be a jurisdiction parameter, an electronic gaming machine platform parameter or a user-defined configuration parameter. The framework application may also be configured to provide a user interface including a selection list of available pluggable modules. The selection list may be updated when a new pluggable module is detected at the one or more storage devices. The framework application may further be configured to load the pluggable module onto the primary portable storage device.

In various implementations of the invention, the pluggable module may include instructions for installing software on the electronic gaming machine, executing a diagnostic on the electronic gaming machine or executing a verification check of the content on the electronic gaming machine. The one or more processors may be further configured to track information of one or more pluggable modules executed on the electronic gaming machine and store the information on a memory of the electronic gaming machine.

In another aspect, the invention provides a method that may be implemented in an electronic gaming machine. The method may involve detecting whether a primary portable storage device is in communication with an electronic gaming machine. The primary portable storage device may include a boot image. The boot image may include a boot code, an operating system and a framework application to execute a pluggable module according to instructions provided by the pluggable module. The method may further involve determining whether the boot image is a signed image. The boot image may be required to be a signed image by a regulatory gaming authority to establish a chain of trust. The method may involve executing the framework application on the primary portable storage device when it is determined that the boot image is a signed image. The method may further involve identifying, via the framework application, one or more storage devices other than the primary portable storage device which stores one or more pluggable modules. The method may also involve determining, via the framework application, whether at least one of the one or more pluggable modules includes a signature. The signature indicates that a pluggable module is operable within the framework application and the pluggable module is approved by the regulatory gaming authority. The method may further involve executing, via the framework application, at least one pluggable module according to instructions provided by at least one pluggable module when it is determined that at least one pluggable module includes the signature.

In various implementations of the invention, the boot image may be required to be signed and approved by the regulatory gaming authority to modify the boot image. The one or more storage devices may be a storage device of the electronic gaming machine, a secondary portable device or a remote host.

In various implementations of the invention, the method may involve selecting, via the framework application, a pluggable module based on a parameter including a jurisdiction parameter, an electronic gaming machine platform parameter or a user-defined configuration parameter. One or more pluggable modules may be modified independently of the boot image. A pluggable module may include instructions for installing software on an electronic gaming machine, executing a diagnostic on the electronic gaming machine or executing a verification check of the content on the electronic gaming machine.

In one aspect, the invention features a gaming system that comprises a primary storage device configured to store a boot image. The boot image may include a boot code, an operating system and a framework application that may be configured to search and execute a pluggable module according to instructions provided by the pluggable module. The framework application may include instructions configured to identify one or more storage devices other than the primary portable storage device, wherein the one or more storage devices is configured to store one or more pluggable modules, and may determine whether at least one of the one or more pluggable modules includes a signature. The signature may indicate that a pluggable module is operable within the framework application and that the pluggable module is approved by the regulatory gaming authority. The framework application may also include instructions to execute at least one pluggable module according to instructions provided by at least one pluggable module when it is determined that at least one pluggable module includes the signature. The gaming system may further comprise an electronic gaming machine. The electronic gaming machine may also include a network interface configured to communicate with one or more remote hosts. The electronic gaming machine may include one or more processors. The one or more processors may be configured to detect whether the primary portable storage device is in communication with the one or more electronic gaming machines and determine whether the boot image is a signed image. The signed image may be required by the regulatory gaming authority to establish a chain of trust. The one or more processors may also be configured to execute the framework application on the primary portable storage device when it is determined that the boot image is a signed image. The one or more remote hosts may be configured to store one or more pluggable modules. The gaming system may further comprise a network configured to provide communication among the electronic gaming machine and the one or more remote hosts via the network interface.

In various implementations of the invention, one or more pluggable modules may be modified independently of the boot image. The one or more pluggable modules may also be modified independently of a different pluggable module.

The invention can include one or more of the following advantage. For instance, the gaming system promotes modularization of software application such that software applications may be created and updated independently of other software applications. For example, a first pluggable module may store gaming software and a second pluggable module may store diagnostic software. In such a scenario, the gaming software stored on the first pluggable module may be updated, replaced and modified independently from the diagnostic software stored on the second pluggable module, and vice versa. Because the pluggable module may be modified independently of other pluggable modules, the development and maintenance of software stored on the pluggable modules are greatly reduced.

Aspects of the invention may be implemented by networked gaming machines, game servers and other such devices. These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for gaming software configuration and gaming device software distribution. These drawings in no way limit any changes in form and detail that may be made to embodiments by one skilled in the art without departing from the spirit and scope of the disclosure.

DETAILED DESCRIPTION

Figure 1A:
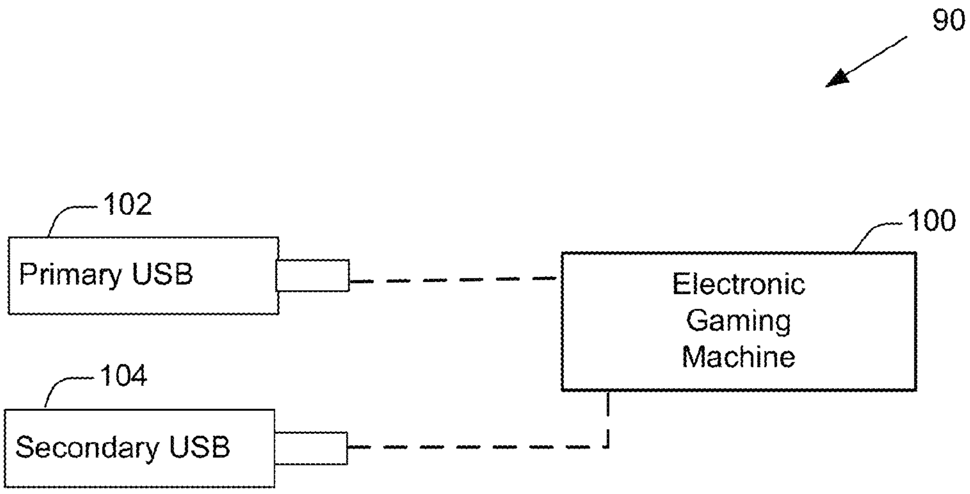
FIG. 1A shows a gaming system for executing an extensible boot image in a gaming environment, performed in accordance with one implementation.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

In some implementations, the techniques described herein provide a mechanism for performing an extensible boot image in a gaming environment. A boot image is a type of disk image that performs a boot process after the boot image is transferred to a boot drive such as a disk drive or a USB flash drive. The boot process is a series of operations performed to start an operating system after an electronic gaming machine is powered on. Generally, a boot image includes an operating system, boot and recovery information and other software applications, such as utilities, diagnostics as a single signed image. Creating a single boot image may take up to two to three weeks or more to ensure that the operating system, which is over five million lines of code, and other software applications are free of any software bugs or errors.

After the boot image is created, the boot image is required to obtain regulatory approval to establish that the boot image is trustworthy. Because gaming machines and the gaming environment are highly regulated, jurisdictional approval is required for every piece of hardware or software used in association with a gaming machine to establish a chain of trust. Once approved, the gaming hardware and software may not be altered. For example, after the boot image is jurisdictionally approved, the content of the boot image may not be changed. In such a situation, updating a boot image with new utilities applications, installation packages or even correcting software bugs require the creation of a new boot image, which may require weeks to create. Additionally, the new boot image would need to be submitted to an associated gaming jurisdiction for approval at which point the content of the boot image would be fixed. Generally, gaming jurisdictions do not allow gaming software, such as the boot image, to be altered in any way after it has been approved. It can be appreciated that creating and updating a boot image in addition to obtaining approval is time consuming and expensive.

One solution to this problem is to separate the content of the boot image such that the operating system, the data and the software applications are not required to be a part of a single signed boot image. For instance, the boot image including the operating system may be stored on a separate bootable storage device. The data, information and software applications may be stored on a separate storage device from the bootable storage device, such as a hard drive of an electronic gaming machine, an external USB hard drive, or a remote server accessible via a network. Such an approach provides a mechanism to maintain and update the operating system, the other data and software application separately and, thus, promotes modularization of the code, provides ease of development and reduces the cost and time of creating and maintaining the boot image and the other data and software applications.

FIG. 1A shows a gaming system 90 for executing an extensible boot image in a gaming environment, performed in accordance with one implementation. The gaming system 90 includes an electronic gaming machine 100, a primary USB device 102 and a secondary USB device 104. The gaming system 90 is provided for illustrative purpose only. A gaming system comprising of multiple gaming machines, multiple primary USB devices and secondary USB devices are also possible.

The electronic gaming machine 100 may be any gaming machine configured to provide a wager-based game to a player. In some implementations, the electronic gaming machine 100 may include one or more USB ports to connect and communicate with external storage devices, such as the primary USB device 102, the secondary USB device 104, an external hard disk drive, an optical disc drives, or any other device with non-volatile memory. In some implementations, the electronic gaming machine 100 may store a Basic Input/output System (BIOS) program on a non-volatile memory or a storage device, such as an erasable programmable read-only memory (EPROM or EEPROM) and the like of the electronic gaming machine. Generally, the BIOS program is configured to initiate a sequence of operations when an electronic gaming machine is powered on. For instance, the BIOS program locates an operating system held on peripheral device of the gaming machine. After locating the operating system, the BIOS program may hand off control of the gaming machine 100 to the operating system. Additional details regarding an electronic gaming machine provided in accordance with one implementation are discussed with respect to FIGS. 5-6B.

In some implementations, the primary USB device 102 may be a primary storage device configured to store a boot image or an extensible boot image. The primary USB device 102 may be inserted into a USB port of the electronic gaming machine 100 to allow the electronic gaming machine and the primary USB device to communicate and transmit data. In some implementations, the primary USB device 102 may be a bootable USB flash drive capable of storing a boot image. The primary USB may be any off the shelf USB flash drive capable of being configured into a bootable USB flash drive. For instance, programs such as, Fedora Live USB Creator®, UNetbootin®, MultiSystem LiveUSB MultiBoot® and the like may be used to program and enable a bootable USB flash drive. In some implementations, the primary USB may be a preconfigured bootable USB flash drive. In some implementations, the primary USB may be any live disc (e.g., live CD, live DVD) capable of storing a boot image.

Figure 1B:
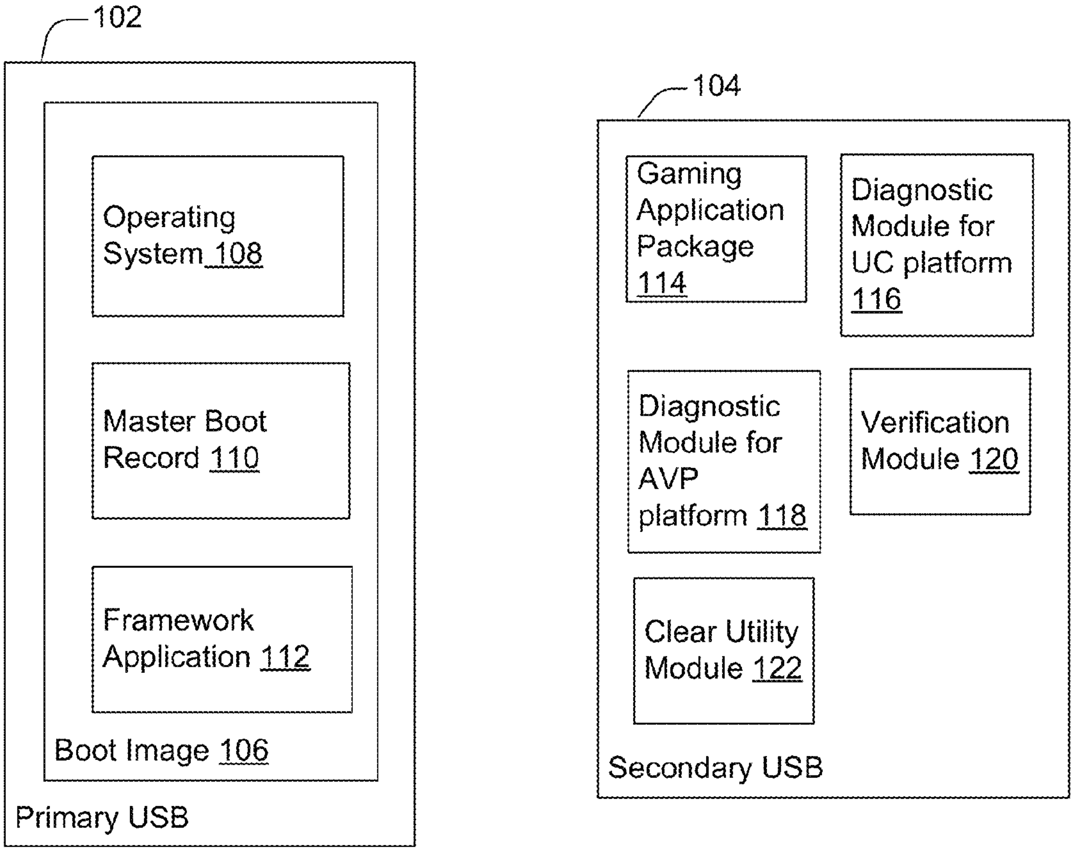
FIG. 1B shows an illustration of a primary Universal Serial Bus (USB) device and a secondary USB device in accordance with one implementation.

FIG. 1B shows the primary USB device 102 in accordance with one implementation. The primary USB device 102 may include a boot image 106. The boot image 106 may include an operating system 108, a master boot record (MBR) 110 and a framework application 112. Although a single boot image, operating system, master boot record and framework application are shown, the primary USB device 102 may comprise of multiple boot images, operating systems, master boot records and/or framework applications. The primary USB device 102 need not include every feature shown. Conversely, the primary USB device 102 may include other features not shown.

The boot image 106 may be a single file or a storage device configured to execute computer instructions to start the operating system 108 when the electronic gaming machine 100 is powered on (i.e., "boot"). As noted, the boot image 106 may include the operating system 108, the MBR 110 and the framework application 112. In some other implementations, the boot image 106 may also include other software applications, other boot and data recovery information, and the like. The boot image 106 may be configured in one of a variety of file formats, such as FAT32, NTFS, ISO 9660, UDF, and the like.

Once the boot image 106 is created, the content of the boot image 106 is signed with a single signature. The signature indicates that the boot image is trusted software that can be used and executed at the electronic gaming machine 100. The signature may be a digital signature, a signature certificate including an electronic signature or any other signature capable of establishing a chain of trust. After the signed boot image 106 is created, the boot image 106 is required to obtain regulatory approval. Once approved, as noted, the boot image 106 may not be altered without creating a new boot image including a new signature and obtaining jurisdictional approval for the new boot image.

The operating system 108 includes software, data and information for managing software applications and hardware of the electronic gaming machine 100. The operating system 108 may be a known operating system such as Windows 7, Mac OS X, Linux, Ubuntu and the like. In some implementations, the operating system 108 may be gaming specific operating systems.

In some implementations, the boot image 106 may include boot code including instructions for execution by one or more processors of the electronic gaming machine 100 when the electronic gaming machine is powered up. For instance, the boot image 106 may include the MBR 110. The MBR 110 may be used to the boot the electronic gaming machine 100. The MBR 110 may be used to locate the operating system 108 in the boot image 106. In some other implementation, the MBR 110 may be used hold a partition table describing the partitions of the primary USB device 102. In some implementations, the boot image 106 may include any other boot code related to booting the operating system 108.

As noted, the boot image 106 includes the framework application 112 programmed to execute one or more pluggable modules as an integrated software program. The pluggable modules may be computer executables, modular software components, plug-ins, and the like. In some implementations, the framework application 112 may be a thin extensible application or a complex software application including mechanisms for incorporating program routines, plug-ins or any other encapsulated software components to extend the functionality of the framework application without requiring modification or reimaging of the boot image 106 on the primary USB device 102. The framework application 112 may be programmed in a programming language such as C#, C++, Java, Visual Basic or any other programming language.

In some implementations, the framework application 112 may be programmed to search and execute pluggable modules residing in various storage devices. For instance, the framework application 112 may search for pluggable software modules in storage devices on the gaming machine, such as the hard drive. The framework application 112 may search for pluggable software modules on external USB drives, such as the secondary USB device 104 for pluggable software modules. Additionally, or alternatively, the framework application 112 may search for pluggable software modules on a remote server 202 (see FIG. 2) connected directly or via network to the electronic gaming machine 100. Once the framework application identifies a pluggable module, the framework application 112 may load the pluggable module on the primary USB device 102 and execute the pluggable module. In some implementations, the framework application 112 may be programmed to load the pluggable module onto the primary USB device 102 by copying the pluggable module from the storage device storing the pluggable module. Additional features and functionality of the framework application 112 in accordance with one implementation are discussed with respect to FIG. 3.

The secondary USB device 104 may be any storage device other than the primary USB device 102 capable of storing one or more pluggable modules. In some implementations, the secondary USB device 104 may be any off the shelf storage device. For example, the secondary USB device 104 may be a USB flash drive, a USB hard drive, a CD-ROM, a DVD-ROM, a floppy disk or diskette, and the like.

Because the pluggable modules stored on the secondary USB device 104 are not required during the boot process of the gaming machine 100, the secondary USB device 104 need not be configured to be a bootable device. Additionally, the pluggable modules stored on the secondary USB device 104 need not be stored as a single signed boot image. In such a configuration, a pluggable module may be independently created, modified and replaced on the secondary USB device without creating a new signed boot image on the primary USB device 102. In some implementations, each pluggable module stored on the secondary USB device 104 may include a separate signature or a signature certificate indicating that the pluggable module is operable within the framework application and compatible with the operating system 108. The pluggable module stored on the secondary USB device 104 may also be approved by the regulatory gaming authority independently of the boot image 106. Because each pluggable module stored on the secondary USB device 104 is a separate encapsulated software application, each pluggable module is capable of being created, signed and jurisdictionally approved independently of any other pluggable module stored on the secondary USB device. It will be appreciated that separating and storing the boot image and the pluggable modules on different storage devices provides a mechanism to modularize the development of the boot image and the pluggable modules. As noted, once the boot image obtains jurisdictional approval, the boot image may not be altered. By developing and storing the pluggable modules on another storage device, such as the secondary USB device 104, the functionality of the operating system 108 may be extended and customized after the boot image 106 has obtained jurisdictional approval.

The secondary USB device 104 may store one or more pluggable modules. As noted, one or more pluggable modules may be computer executables, modular software components, plug-ins and the like capable of executing as part of the framework application 112. In some implementations, the secondary USB device 104 may include a variety of pluggable modules configured for installing software applications on the gaming machine 100, running diagnostics to test different devices of the electronic gaming machine, executing applications to verify and check the content of the different devices of the gaming machine 100, executing antivirus utilities, or any other software module.

For instance, the secondary USB device 104 stores a pluggable module gaming application package 114. The gaming application package 114 may be a software package including gaming software for installation on the gaming machine 100. The secondary USB device 104 also stores, for example, diagnostic modules 116 and 118 for specific gaming machine platform such as IGT's UC, AVP or AVP 4.0 platforms. The diagnostic modules may execute tests on the various devices of the electronic gaming machine 100. Additionally, the secondary USB device 104 includes a verification module 120 to verify the content of the electronic gaming machine 100 and a clear utility module 122 configured to clear content of storage devices of the electronic gaming machine 100. In some implementations, the secondary USB device 104 may be configured to store a pluggable module with data recovery information. In another implementation, the secondary USB device 104 may be configured to store a pluggable module including additional boot process information. The pluggable modules shown in FIG. 1B are for illustrative purposes only. The secondary USB device 104 may be store other types of pluggable modules.

Figure 2:
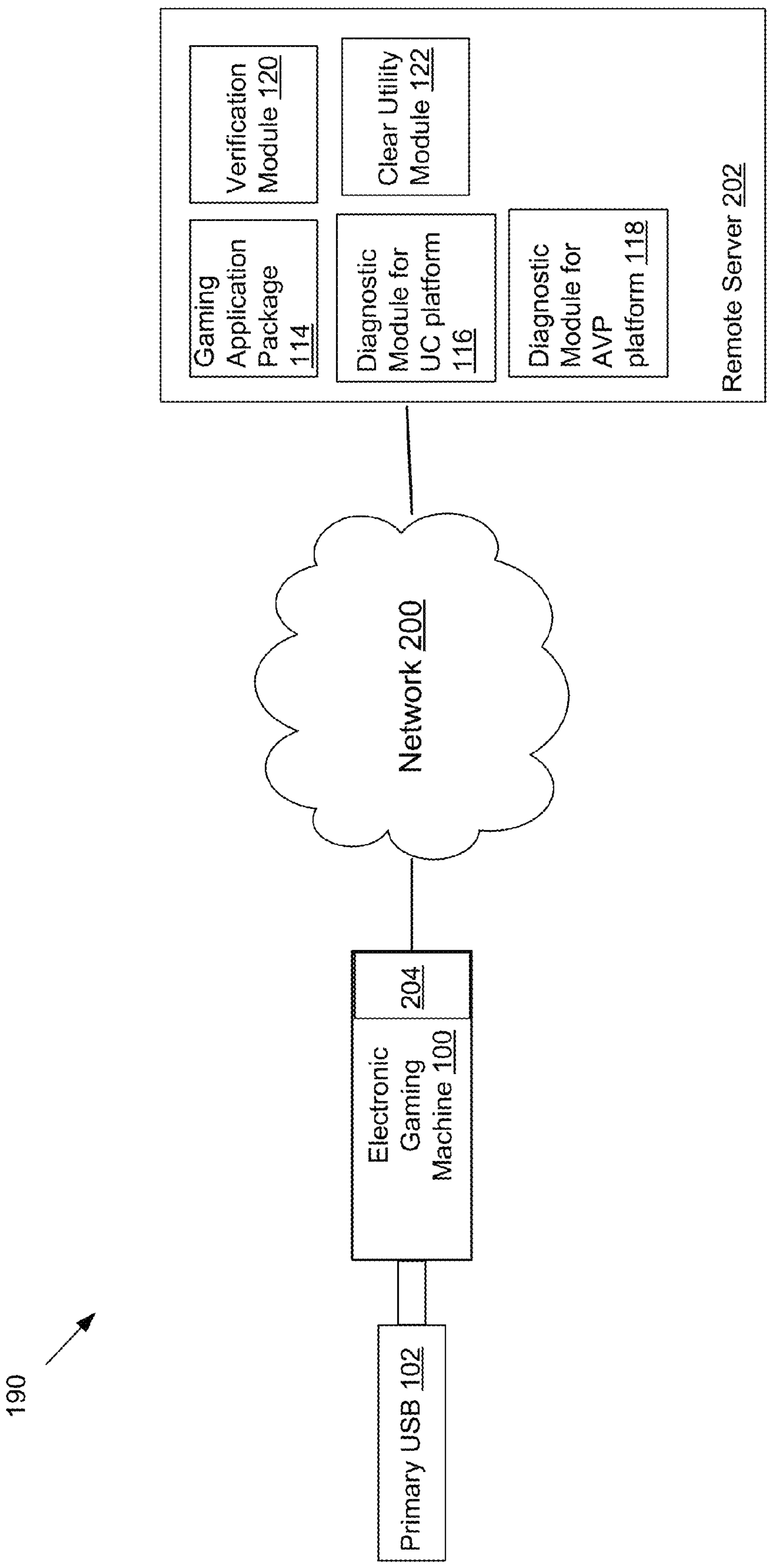
FIG. 2 shows a gaming system for executing an extensible boot image in accordance with one implementation.

FIG. 2 shows a gaming system 190 for executing an extensible boot image in accordance with one implementation. The gaming system 190 includes the primary USB device 102, the electronic gaming machine 100, a network 200 and the remote server 202. In some implementations, the gaming system 190 may include the primary USB device 102, the secondary USB device 104, the electronic gaming machine 100, the network 200 and the remote server 202. In some implementations, the gaming system 190 may comprise of one or more electronic gaming machines, multiple primary USB devices, multiple secondary USB devices, and/or one or more remote servers.

In some implementations, the electronic gaming machine 100 may include a network interface 204 configured to communicate with the remote server 202 directly or via the network 200. The network interface 204 may be implemented as any combination of hardware and software capable of allowing the gaming machine 100 to communicate with the remote server 202. In some implementations, the network interface may be a network interface controller device, such as a network interface card, a network adapter, a local area network (LAN) adapter and the like.

As described in FIGS. 1A and 1B, the primary USB device 102 may be configured to store the boot image 106. The primary USB may be coupled with the electronic gaming machine 100 such that the operating system 108 manages and controls all the hardware and software applications of the electronic gaming machine 100 from the primary USB device 102.

The network 200 may be one of a variety of networks, such as a LAN, a wide area network (WAN), a wireless network, an intranet or the Internet. The electronic gaming machine 100 and the remote server 202 may communicate via the network 200 with the use of one or more communication protocols, such as TCP/IP, HTTP, HTML, SAS, G2S and the like.

Similar to the secondary USB device 104, the remote server 202 may be any server capable of storing one or more pluggable modules. In some implementations, the remote server 202 may be a server controlled by the gaming property at which the electronic gaming machine 100 is located. Alternately, or additionally, the remote server 202 may be controlled by another entity, such as the gaming machine manufacturer, the gaming machine software developer, or a third party.

The remote server 202 may store a wide a variety of pluggable modules programmed to function with the framework application 112 as described in FIGS. 1A-1B. For instance, the remote server 202 may store pluggable modules, such as the gaming application package 114, the diagnostic modules 116 and 118, the verification module 120 and the clear utility module 122 as described in FIG. 1B. In some implementations, the pluggable modules may be stored on one or more servers across the network 200. In some implementations, the pluggable modules may be stored on one or more network drives or any other storage device capable of storing pluggable modules and capable of communicating with the gaming machine 100 via the network 200. In some implementations, some pluggable modules may be stored on the secondary USB device 104 and other pluggable modules may be stored on the remote server 202.

Figure 3:
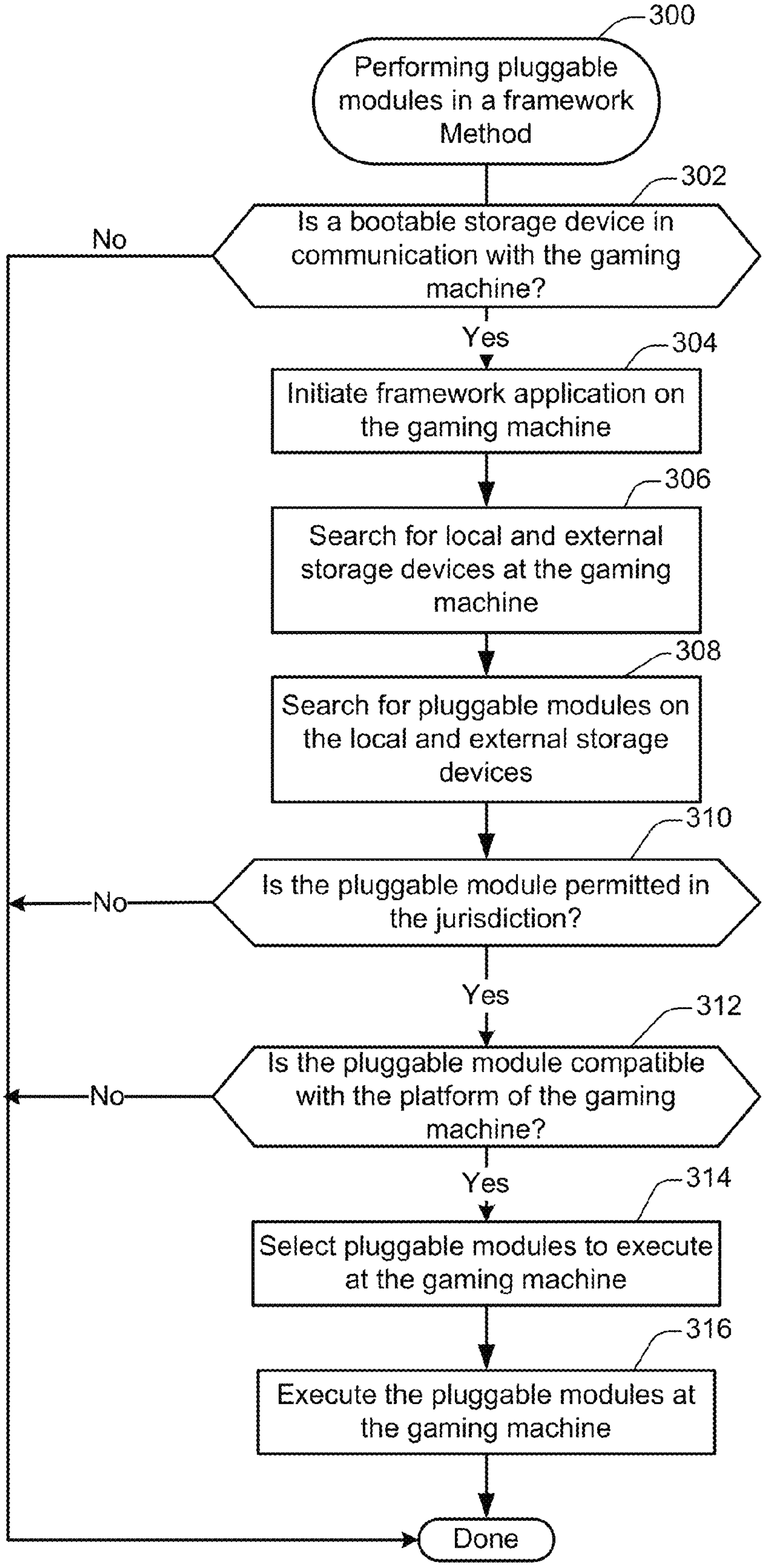
FIG. 3 shows a flowchart of a method for performing pluggable modules in a framework application, performed in accordance with one implementation.

FIG. 3 shows a flowchart of a method 300 for performing pluggable modules in a framework application, performed in accordance with one implementation. In some implementations, the method 300 may be performed at an electronic gaming machine. The electronic gaming machine may be coupled to one or more external storage devices capable of storing one or more pluggable modules. In other implementations, the electronic gaming machine may be connected to one or more remote servers configured to store one or more pluggable modules directly or via a network. In yet another implementation, the electronic gaming machine may be connected to one or more storage devices and connected to one or more remote servers configured to store one or more pluggable modules.

At 302, it is determined whether a bootable storage device, such as the primary USB device 102, is in communication with a gaming machine. In some implementations, a casino operator may insert the primary USB device 102 into a USB port of a gaming machine. Once the primary USB device 102 is coupled to the gaming device, the operator powers up the gaming machine to initiate the boot process to start the operating system 108. In some implementations, one or more processors of the gaming machine execute a BIOS program to determine whether a boot device, such as the primary USB device 102, is in communication with the gaming machine.

In some implementations, the BIOS program may be programmed to cause one or more processors to detect and record the devices connected to the gaming machine. For example, the BIOS program may detect the hard drives of the gaming machine, external USB hard drives coupled to the gaming machine, detect a USB flash drive, and detect a variety of other storage devices. Then, the software program may check the boot information on the device to determine whether the device is a boot device. For instance, the BIOS program may check for a "bootable" flag on the primary partition of the primary USB device 102. In another example, the BIOS program may determine that the device is bootable when the software program finds a complete operating system stored on the device.

In some implementations, the BIOS program may be configured to check devices for boot information in a certain order. For instance, the boot order of the BIOS program may be configured such that the boot information of the primary USB device 102 is checked first instead of the hard drive of the gaming machine. In such a configuration, the operating system 108 stored on the primary USB is started instead of the native operating system of the gaming machine 100.

In some implementations, the software program may be further configured to determine whether the boot image is a signed image. The signature establishes a chain of trust that the boot image is trusted software and approved by a regulatory gaming authority. For example, the signature may be a digital signature stored on the first partition of the primary USB device 102. In some implementations, the BIOS program will not hand over control of the boot process to the primary USB device 102 unless the boot image 106 is signed.

In some implementations, when it is determined the boot image 106 is a signed image, the BIOS program may search for a boot record on the primary USB device 102 and pass control of the boot process to the boot record. For instance, the BIOS may search for the MBR 110 in the primary partition of the primary USB device 102. The MBR 110 may be configured to determine the active partitions of the primary USB device 102 that includes the operating system 108. Once the MBR 110 locates the operating system 108, the MBR 110 may be configured to cause the operating system 108 to execute processes from the primary USB device 102 to manage hardware and software on the gaming machine.

In some implementations, if it is determined that a bootable storage device, such as the primary USB device 102, is not in communication with the gaming machine, then method 300 ends without proceeding to the operation 302. For example, if the BIOS program does not locate the primary USB device 102 in communication with the gaming machine, then the BIOS program may be configured to boot (i.e., start) the native operating system of the gaming machine.

At 304, the framework application 104 is initiated at a primary storage device such as the primary USB device 102. In some implementations, the operating system 108 may be configured to automatically execute the framework application 112 after the boot process is completed. In some implementations, the operating system 108 may provide a graphical user interface (GUI) from which a casino operator may select to execute the framework application 112.

In some implementations, the framework application 112 provides a mechanism to decouple the operating system 108 from the pluggable modules such that the operating system and the pluggable modules are not required to be stored on one primary bootable storage device as a single signed boot image. Instead, the pluggable modules may be stored on secondary storage devices, such as the secondary USB device 104 and the remote server 202, and the boot image including the operating system and the framework application may be stored on a primary bootable storage device, such as the primary USB device 102. Such an implementation provides the flexibility to create and update the pluggable modules stored on secondary storage devices even after the boot image stored on the primary bootable device has obtained jurisdictional approval.

Although the pluggable modules are stored on a separate storage device than the framework application, the framework application provides a mechanism to execute the pluggable modules as a seamless and integrated software program. In some implementations, the framework application may be a thin application capable of executing encapsulated software components, such as the pluggable modules described in FIGS. 1A-2. In some implementations, the framework application may be complex software application such that the pluggable modules may execute and interact with the framework application to extend the functionalities of the framework application.

At 306, devices capable of storing pluggable modules are searched and identified. In some implementations, the framework application may be configured to search and identify storage devices at various times and in various ways. In a first example, storage devices may be searched and identified on demand. For example, the framework application may provide a GUI with a button that a user may select to search and identify storage devices in communication with the gaming machine 100. In a second example, the framework application may be programmed to search and identify storage devices periodically or at scheduled times. For instance, the framework application may be programmed to search for storage devices after every few minutes. In a third example, the operation 306 may be activated when a trigger event is detected, such as the insertion of the secondary USB device 104 or any other external storage device to the gaming machine 100.

In some implementations, the framework application may be programmed to search for one or more storage devices other than the primary USB device 102 in communication with the gaming machine 100. For instance, the framework application may be programmed to search and record the different storage devices of the gaming machine 100, such as the local hard drive, non-volatile memory, and the like. Additionally, or alternatively, the framework application may be programmed to search and identify external storage devices coupled to the gaming machine 100, such as the secondary USB device 104 described in FIGS. 1A-1B. The framework application may also search for other external storage devices, such as external USB hard drives, USB flash drives, and any other external storage device capable of storing one or more pluggable modules. In some implementations, the framework application may be programmed to search and identify one or more remote servers, such as the remote server 202, in communication with the gaming machine 100. In some implementations, the framework application is capable of searching and identifying any combination of internal and external storage devices of the gaming machine 100.

At 308, pluggable modules are searched and identified on the storage devices identified in operation 306. In some implementations, the framework application may be configured to search and identify pluggable modules at various times and in various ways. For example, the framework application may be programmed to search and identify pluggable modules on-demand, periodically or at scheduled times. In another example, the framework application may be programmed to search and identify pluggable modules when a triggering event such as a pluggable module being saved onto the secondary USB device 104, detecting a storage device coupled to the gaming machine 100, and the like.

In some implementations, the framework application may be programmed to refer to a reference list of potentially available pluggable modules. In such an implementation, the framework application may compare the reference list to determine whether a specific pluggable module is available and found on a storage device. In some implementations, the reference list may be hard coded into the framework application. In some other implementations, the framework application may cause one or more processors of the gaming machine to access a configuration file that includes a list of compatible pluggable modules from a memory of the gaming machine.

In some implementations, the framework application may be programmed to search and identify pluggable modules at runtime. For example, the framework application identifies the secondary USB device 104 and detects the different files stored on the secondary USB. In this example, the secondary USB device 104 may include the gaming application package 114 for installing gaming programs on the gaming machine. The gaming application package 114 may be a zip file that the framework application decompresses to view the different gaming applications included in the gaming application package 114. In some implementations, the framework application may be configured to examine the metadata of each gaming application in the package 114. The metadata of the gaming application may include an identifier that the gaming application is a software component compatible with framework application. For instance, the gaming application may be an executable that includes a dynamic-link library (DLL) interface indicating the imports and exports of the gaming application that allows the framework application to identify the gaming application as a pluggable module.

In some implementations, the framework application may be programmed to identify a software component as a pluggable module when the software component includes a signature. The signature ensures that the pluggable module is trustworthy and ensures that the pluggable modules have not been tampered with. Additionally, the signature may indicate that pluggable module is operable within the framework application. In some implementations, the signature may be a digital signature or any other signature to establish a chain of trust.

In some implementations, the framework application may be programmed to examine the metadata of a software component for a signature. In some implementations, a software component may be associated with a signature certificate stored on the secondary USB device 104 or some other storage device. In some implementations, the signature certificate may be an electronic document including a digital signature. The framework application may be configured to determine whether a software component is associated with a signature certificate. If a software component is associated with a signature certificate, then the software component is identified as a pluggable module capable of being executed with the framework application.

Additionally, or alternatively, the framework application may authenticate the signature of a software component prior to identifying the software component as a pluggable module. In some implementations, the framework application may authenticate the signature depending on the signature scheme being used, such as the public key infrastructure (PKI) scheme, and the like. For example, the framework application may detect a software component that includes a signed hash code. The framework application may use a digital signature algorithm, such as the RSA public key cipher to decrypt the signed hash code of the software component. If the signed hash code of the software component matches the signed hash code of the boot image, then the software component is authenticated as a trusted pluggable module capable of being executed by the framework application. Once the pluggable module is identified and authenticated, the framework application may cause one or more processors of the gaming machine to load the pluggable module onto the primary storage device, such as the primary USB device 102. In some implementations, the framework application may simply verify that the signature was issued by the proper entity, such as a software manufacturer of the boot image, a regulatory gaming authority, and the like.

At 310, it is determined whether the pluggable module detected in the operation 308 is permitted in the jurisdiction of the gaming machine. For instance, the framework application may be programmed to read the gaming device information of the gaming device to determine which jurisdiction the gaming machine is located. Then, the framework application compares this information with the information included in the metadata of a pluggable module to determine whether a particular pluggable module is permitted to be executed on the gaming machine. If the pluggable module is permitted in the jurisdiction, then the pluggable module is loaded onto the primary USB device 102 and the framework application proceeds to operation 312. In some implementations, the framework application may proceed to operation 316 and automatically execute the pluggable module once it is determined the pluggable module is permitted in the jurisdiction. In such an implementation, the framework application may be programmed to filter pluggable modules only based on the jurisdiction of the gaming machine and not based on any other criterion. If the pluggable module is not identified as a module to be executed on the gaming machine, then the method 300 may end without the framework application executing a pluggable module. In some implementations, if a pluggable module is not identified at the operation 310, then the framework application may continue to search for other pluggable modules on the local and external storage devices as described in the operations 306 and 308.

At 312, it is determined whether the pluggable module is compatible with the platform, i.e., the hardware and software architecture, of the gaming machine. For example, the framework application identifies the diagnostic modules for the IGT's UC platform 116 and IGT's AVP platform 118 stored on the secondary USB device 104. The diagnostic modules may be configured to execute applications to test the devices and verify the content of the gaming machine. In this example, the framework application reads the device information to determine the platform of the gaming machine. Then, the framework application may examine the metadata of the diagnostic modules 116 and 118 and compare it with the platform information of the gaming machine. If the gaming machine is an IGT UC platform, the framework application may filter out the diagnostic module 118 and load the diagnostic module 116 onto the primary module 102. The diagnostic 116 may be loaded onto the primary USB by simply copying the diagnostic module 116 from the secondary USB device 104 to the primary USB device 102.

If the framework application determines the pluggable module is compatible with the platform of the gaming machine, then the framework application proceeds to operation 314 to allow a casino operator to select pluggable modules to execute. In some implementations, the framework application may determine the pluggable module is compatible with the platform of the gaming machine and proceed to operation 316 to automatically execute the pluggable module without asking the operator to select pluggable modules to execute. If the framework application determines the pluggable module is not compatible, the method 300 may end without the framework application executing a pluggable module. In some implementations, if the framework application determines the pluggable module is not compatible, the framework application may proceed to search for additional storage devices that store other pluggable modules as described in the operations 306 and 308.

In some implementations, the framework application may be programmed to filter the pluggable modules based on different criterions other than jurisdictional location of the gaming machine or the gaming machine platform. In some implementations, the framework application may be programmed to filter out pluggable modules that may have been previously executed on the gaming machine. For instance, the memory of the gaming machine may store a log of the different pluggable modules executed on the gaming machine. The log may record a wide variety of information such as the date, time and frequency that a pluggable module was executed at a gaming machine. The log may also record which version of the pluggable module was executed. In another example, the log may also record the casino operator that initiated the boot process at the gaming machine, and any other relevant information.

The framework application may be configured to access the log from the memory of the gaming machine. The framework application compares the pluggable modules identified at the operation 308 to the pluggable modules recorded in the log and determines which of the identified pluggable modules should be executed. For example, the framework application may identify the diagnostic module for the AVP platform 118 and the verification module 120 as available signed pluggable modules. Then, the framework application examines the log stored on the memory of the gaming machine. The log may indicate that the diagnostic module 118 has previously been executed on the gaming machine 100. The framework application may filter out the diagnostic module 118 and load verification module 120 onto the primary USB device 102.

In some implementations, a user may define the parameters used to filter through the pluggable modules. For example, a casino operator may define a parameter such that only wager-based games from a particular gaming software provider are installed on the gaming machine of his casino. In another example, a user may define a parameter to filter out pluggable modules based on the date and/or time the pluggable module was created or updated. It will be appreciated that a user may define a wide variety of parameters to filter pluggable modules.

In some implementations, a user may define the different filter parameters at the time the framework application is being configured. For example, a programmer may program a library or define a class of parameters that may be used to filter pluggable modules. In some implementations, the filter parameters may be created with the use of a GUI. The framework application may be configured to present a GUI that includes a form that provides user interface components such as text boxes and drop down menus. Using these user interface components, the user may define parameter to filter the pluggable modules. For instance, the GUI may provide a dropdown menu of predefined or user-defined filter parameters that the casino operator may select.

At 314, pluggable modules are selected to execute at the gaming machine. In some implementations, after the pluggable modules are filtered, the framework application may provide a GUI with a selection list of available pluggable modules to execute at the gaming machine. The GUI may include a form with user interface components such as text boxes and drop down menus. For instance, the GUI may provide a drop down menu of available pluggable modules and the casino operator may make a selection of one or more pluggable modules to execute at the gaming machine.

Figure 4:
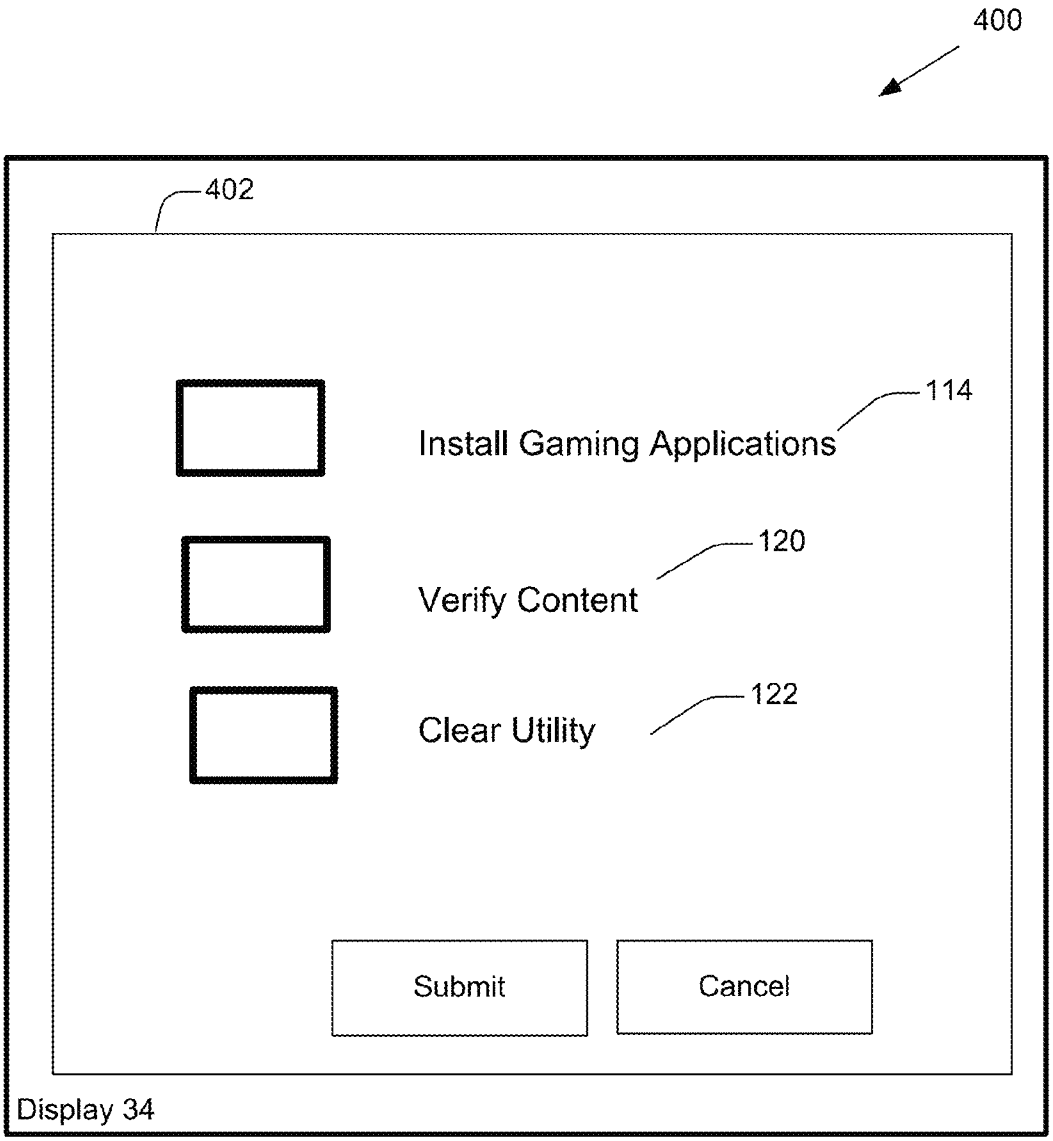
FIG. 4 shows a user interface of a framework application in accordance with one implementation.

FIG. 4 shows a user interface 400 in which a selection list 402 of available pluggable modules are displayed on a display 34 (see FIGS. 5-6B) according to one or more implementations. The selection list 402 indicates that the installing gaming application package 114, the verify content module 120 and the clear utility module 122 are available for the framework application to execute. The user may select a single module to execute or may select more than one pluggable module to execute.

In some implementations, the selection list may be determined based on the pluggable modules loaded on the primary USB device 102. In some implementations, the selection list may be based on a record created during the filtering process in the operations 310 and 312. In some implementations, the selection list may be updated on-demand. For instance, the selection list 402 may include a button that a casino operator may select to update the selection list 402. In such a scenario, the casino operator may couple an external storage device and press the button to update the selection list such that the pluggable modules on the external storage device are included in the selection list 402. In some implementations, the framework application may be programmed to update the selection list 402 when a triggering event is detected such as a pluggable module being saved onto the secondary USB, the coupling of an external hard drive to the gaming machine and the like.

In some implementations, the framework application may be automated such that a casino operator is not required to select pluggable modules to execute at the gaming machine. The framework application may, thus, skip the operation 314 and execute the selected pluggable modules automatically at 316.

At the operation 316, the pluggable modules are executed. In some implementations, the framework application may execute the pluggable modules selected at operation 314. In some implementations, the framework application may be programmed to receive user selections from a GUI, such as the user interface depicted in FIG. 4. The framework application may be programmed to associate a selection from the GUI to a pluggable module. The framework application may include programming code to analyze a string in a selection list and determine if the string matches the file name of a pluggable module. In another example, a selection from the GUI may be configured to include a programming pointer to the location of the pluggable module on the primary USB device 102 or the location of the pluggable module on the secondary USB device 104 or any other storage device. After it is determined which pluggable module is selected, the framework application may load the pluggable module from the storage device onto the primary USB device 102 and execute the pluggable module. In some implementations, the pluggable module may have been previously loaded onto the primary USB device 102 after the operations 308-312.

In some implementations, the framework application may be automated and execute all the application that were loaded on the primary USB device 102. In some implementations, the framework application may execute an application based on a record of available pluggable modules created after the operations 308-312. For instance, the framework application may be programmed to create a programming queue of the available modules that include the locations of the pluggable modules. If the pluggable module has not been previously loaded on the primary device, the pluggable module may be loaded and then executed.

In some implementations, after the execution of each pluggable module, one or more processors may be configured to create a log of pluggable modules executed at the gaming machine. In some implementations, the log may be similar to the log described at the operation 310. For instance, the one or more processor may be configured to record in the log the time and date the pluggable module was executed, the software version of the pluggable module, the casino operator that executed the pluggable module, and other similar information. In such an implementation, the information may be used by the other casino operators to efficiently figure out which software has been installed or executed at a particular gaming machine.

Figure 5:
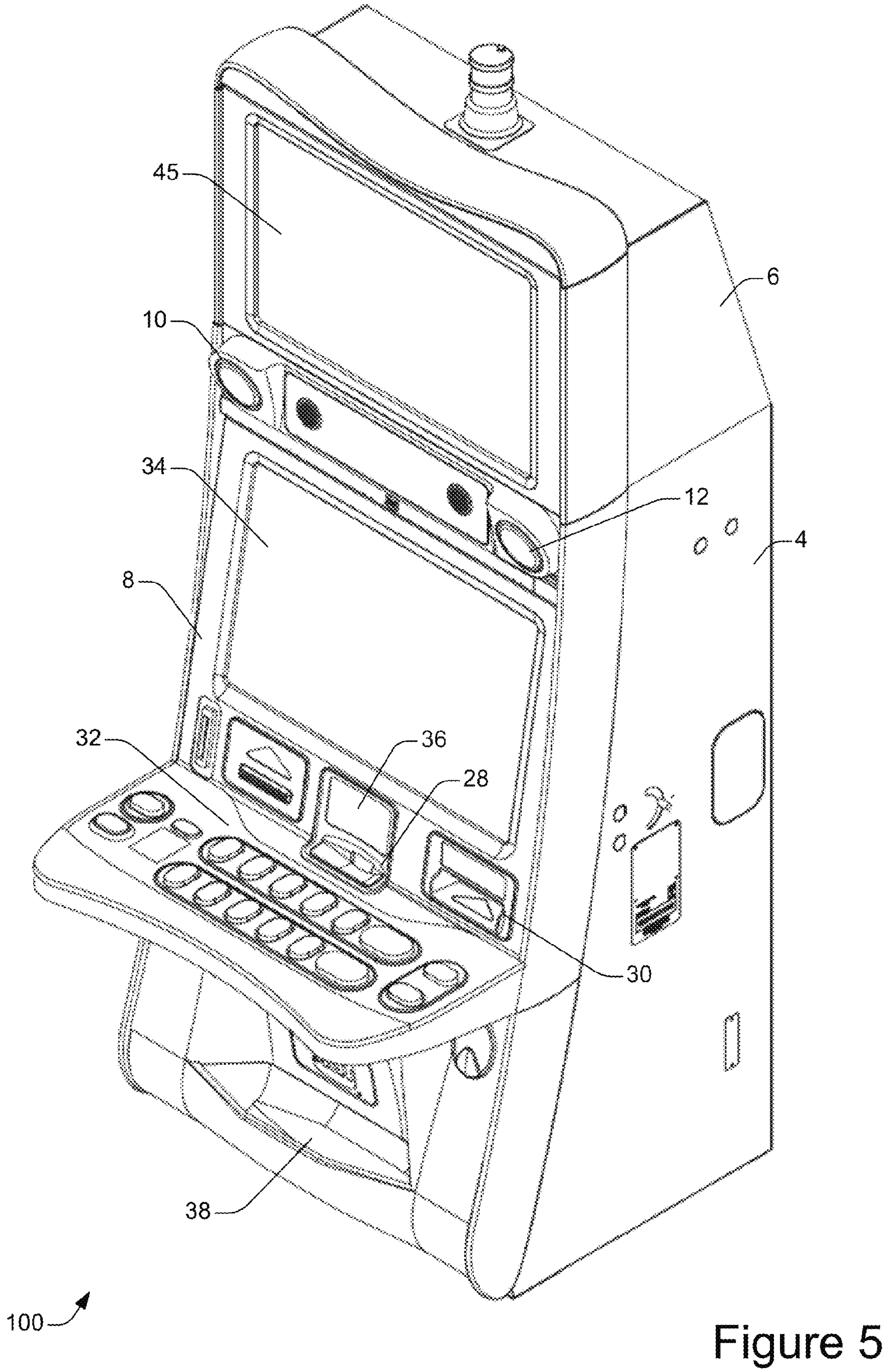
FIGS. 5, 6A, and 6B show perspective diagrams of a gaming machine 100, configured in accordance with one implementation.
Figure 6A:
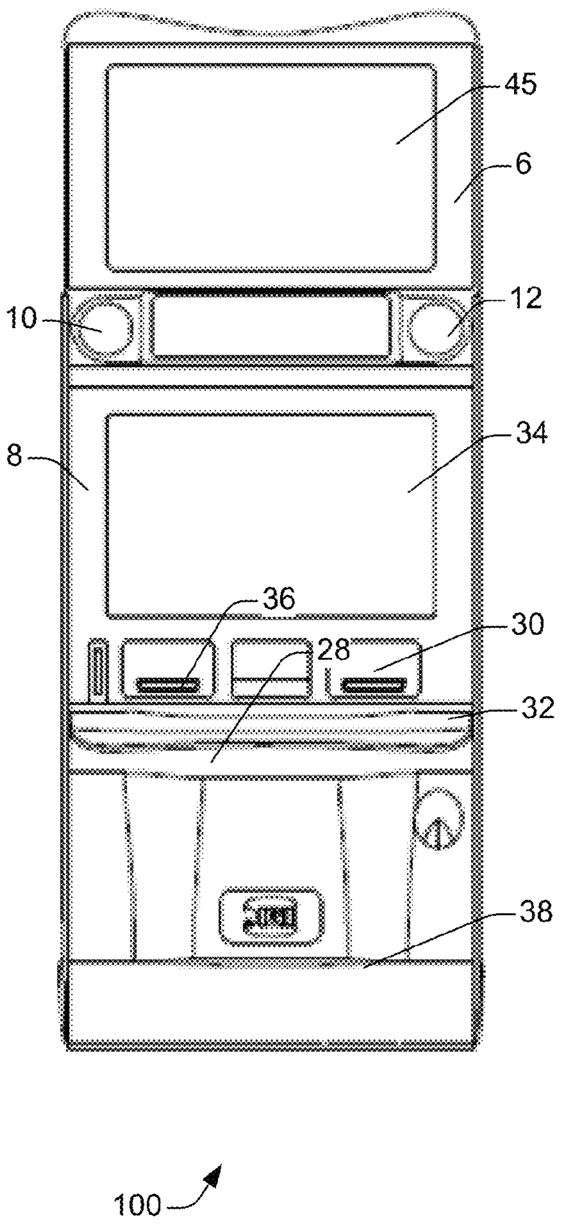
Figure 6B:
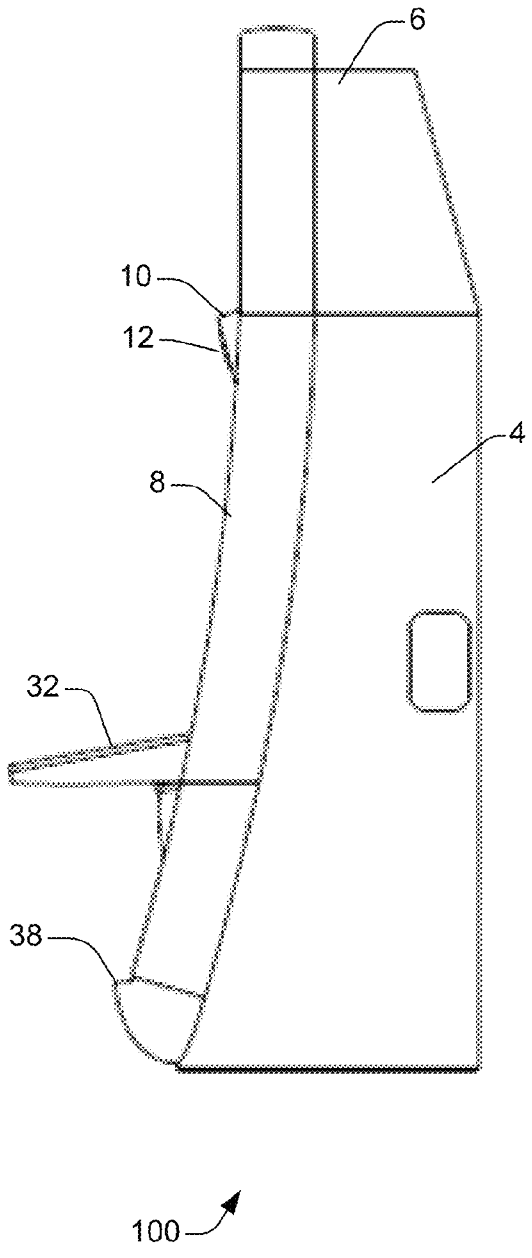

FIGS. 5, 6A, and 6B show perspective diagrams of the gaming machine 100, configured in accordance with one implementation. As illustrated in FIGS. 5, 6A, and 6B, the gaming machine 100 includes a main cabinet 4, which generally surrounds the machine interior and is viewable by users. The main cabinet includes a main door 8 on the front of the machine, which opens to provide access to the interior of the machine.

In some implementations, the electronic gaming machine may include any of a plurality of devices. For example, the electronic gaming machine may include a ticket printer that prints bar-coded tickets, a key pad for entering player tracking information, a display (e.g., a video display screen) for displaying player tracking information, a card reader for entering a magnetic striped card containing player tracking information, and any other devices. The ticket printer may be used to print tickets for a cashless ticketing system. In FIGS. 5, 6A, and 6B, attached to the main door is a payment acceptor 28, a bill validator 30, and a coin tray 38. The payment acceptor may include a coin slot and/or a payment, note, or bill acceptor, where the player inserts money, coins, tokens, or other types of payments.

In some implementations, devices such as readers or validators for credit cards, debit cards, smart cards, or credit slips may facilitate payment. For example, a player may insert an identification card into a card reader of the gaming machine. The identification card may be a smart card coded with a player's identification, credit totals (or related data) and other relevant information. As another example, a player may carry a portable device, such as a cell phone, a radio frequency identification tag or any other suitable wireless device. The portable device may communicates a player's identification, credit totals (or related data), and/or any other relevant information to the gaming machine. As yet another example, money may be transferred to a gaming machine through electronic funds transfer. When a player funds the gaming machine, a logic device coupled to the gaming machine may determine the amount of funds entered and display the corresponding amount on a display device.

In some implementations, attached to the main door is a plurality of player-input switches or buttons 32. The input switches can include any suitable devices which enables the player to produce an input signal which is received by the processor. The input switches may include a game activation device that may be used by the player to start any primary game or sequence of events in the gaming machine. The game activation device can be any suitable play activator such as a "bet one" button, a "max bet" button, or a "repeat the bet" button. In some instances, upon appropriate funding, the gaming machine may begin the game play automatically. Alternately, the gaming machine may automatically activate game play after detecting user input via the game activation device.

In some implementations, one input switch is a cash-out button. The player may push the cash-out button and cash out to receive a cash payment or other suitable form of payment corresponding to the number of remaining credits. For example, when the player cashes out, the player may receive the coins or tokens in a coin payout tray. As another example, the player may receive other payout mechanisms such as tickets or credit slips redeemable by a cashier (or other suitable redemption system) or funding to the player's electronically recordable identification card. As yet another example, funds may be transferred from the gaming machine to the player's smart card.

In some implementations, one input switch is a touch-screen coupled with a touch-screen controller, or some other touch-sensitive display overlay to enable for player interaction with the images on the display. The touch-screen and the touch-screen controller may be connected to a video controller. A player may make decisions and input signals into the gaming machine by touching the touch-screen at the appropriate places. One such input switch is a touch-screen button panel.

In some implementations, the gaming machine may include communication ports for enabling communication of the gaming machine processor with external peripherals, such as external video sources, expansion buses, game or other displays, a SATA port, a key pad, or a network interface for communicating via a network.

In some implementations, the electronic gaming machine may include one or more display devices. For example, the electronic gaming machine 100 includes the display device 34 and an information panel 36. The display device 34 and the information panel 36 may each include any of a cathode ray tube, an LCD, a light emitting diode (LED) based display, an organic light emitting diode (OLED) based display, a polymer light emitting diode (PLED) based display, an SED based-display, an E-ink display, a plasma display, a television display, a display including a projected and/or reflected image, or any other suitable electronic display device.

In some implementations, the display devices at the gaming machine may include one or more electromechanical devices such as one or more rotatable wheels, reels, or dice. The display device may include an electromechanical device adjacent to a video display, such as a video display positioned in front of a mechanical reel. The display devices may include dual-layered or multi-layered electromechanical and/or video displays that cooperate to generate one or more images. The display devices may include a mobile display device, such as a smart phone or tablet computer that allows play of at least a portion of the primary or secondary game at a location remote from the gaming machine. The display devices may be of any suitable size and configuration, such as a square, a rectangle or an elongated rectangle.

In some implementations, the display devices of the gaming machine are configured to display game images or other suitable images. The images may include symbols, game indicia, people, characters, places, things, faces of cards, dice, and any other images. The images may include a visual representation or exhibition of the movement of objects such as mechanical, virtual, or video reels and wheel. The images may include a visual representation or exhibition of dynamic lighting, video images, or any other images.

In some implementations, the electronic gaming machine may include a top box. For example, the gaming machine 100 includes a top box 6, which sits on top of the main cabinet 4. The top box 6 may house any of a number of devices, which may be used to add features to a game being played on the gaming machine 100. These devices may include speakers 10 and 12, a display device 45, and any other devices. Further, the top box 6 may house different or additional devices not illustrated in FIGS. 5, 6A, and 6B. For example, the top box may include a bonus wheel or a back-lit silk screened panel which may be used to add bonus features to the game being played on the gaming machine. As another example, the top box may include a display for a progressive jackpot offered on the gaming machine. As yet another example, the top box may include a smart card interaction device. During a game, these devices are controlled and powered, at least in part, by circuitry (e.g. a master gaming controller) housed within the main cabinet 4 of the machine 100.

In some implementations, speakers may be mounted and situated in the cabinet with an angled orientation toward the player. For instance, the speakers 10 and 12 located in the top box 6 of the upper region of gaming machine 100 may be mounted and situated in the cabinet with an angled orientation down towards the player and the floor. In one example, the angle is 45 degrees with respect to the vertical, longitudinal axis of the machine 100. In another example, the angle is in a range of 30-60 degrees. In another example, the angle is any angle between 0 and 90 degrees. In some implementations, the angle of speakers in the gaming machine may be adjustable. For instance, speakers may be adjusted to face in a direction more closely approximating an estimated position of a player's head or facial features.

The bill validator 30, the player-input switches 32, display screen 34, and other gaming devices may be used to present a game on the gaming machine 100. The devices may be controlled by code executed by a master gaming controller housed inside the main cabinet 4 of the machine 100. The master gaming controller may include one or more processors including general purpose and specialized processors, such as graphics cards, and one or more memory devices including volatile and non-volatile memory. The master gaming controller may periodically configure and/or authenticate the code executed on the gaming machine.

In some implementations, the gaming machine may include a sound generating device coupled to one or more sounds cards. The sound generating device may include one or more speakers or other sound generating hardware and/or software for generating sounds, such as playing music for the primary and/or secondary game or for other modes of the gaming machine, such as an attract mode. The gaming machine may provide dynamic sounds coupled with attractive multimedia images displayed on one or more of the display devices to provide an audio-visual representation or to otherwise display full-motion video with sound to attract players to the gaming machine. During idle periods, the gaming machine may display a sequence of audio and/or visual attraction messages to attract potential players to the gaming machine. The videos may also be customized for or to provide any appropriate information.

In some implementations, the gaming machine may include a sensor, such as a camera that is selectively positioned to acquire an image of a player actively using the gaming machine and/or the surrounding area of the gaming machine. The sensor may be configured to capture biometric data about a player in proximity to the gaming machine. The biometric data may be used to implement mechanical and/or digital adjustments to the gaming machine. Alternately, or additionally, the sensor may be configured to selectively acquire still or moving (e.g., video) images. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol, animated avatar, or game indicia.

The gaming machine 100 is but one example from a wide range of gaming machine designs on which the techniques described herein may be implemented. For example, not all suitable gaming machines have top boxes or player tracking features. Further, some gaming machines have only a single game display—mechanical or video, while others may have multiple displays.

Figure 7:
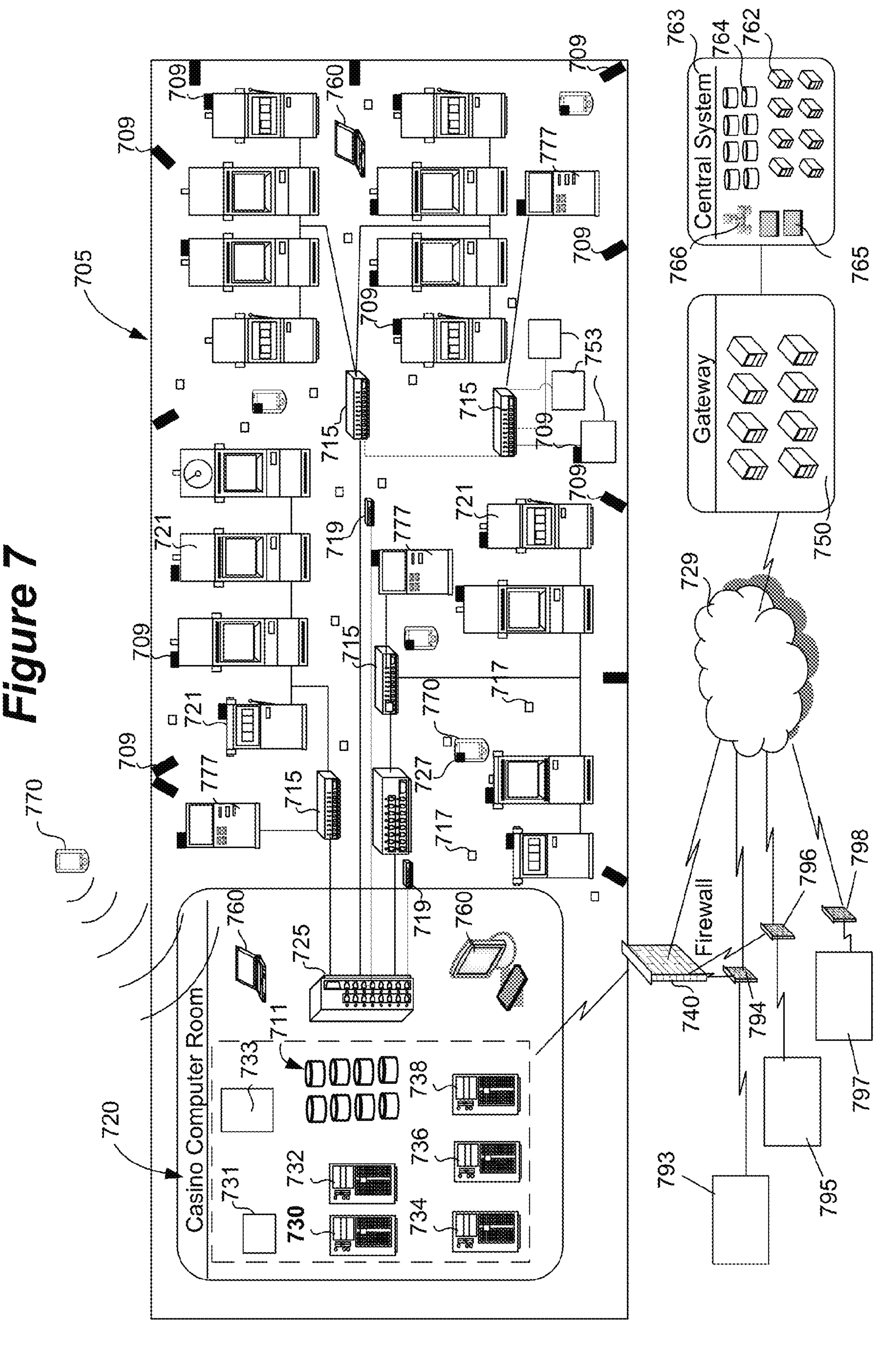
FIG. 7 shows a server-based (Sb™) gaming network, configured in accordance with some implementations.

FIG. 7 shows a server-based (Sb™) gaming network, configured in accordance with some implementations. Those of skill in the art will realize that this architecture and the related functionality are merely examples and that the present disclosure encompasses many other such embodiments and methods.

Here, casino computer room 720 and networked devices of a gaming establishment 705 are illustrated. Gaming establishment 705 is configured for communication with central system 763 via gateway 750. Gaming establishments 793 and 795 are also configured for communication with the central system 763.

In some implementations, gaming establishments may be configured for communication with one another. In this example, the gaming establishments 793 and 795 are configured for communication with the casino computer room 720. Such a configuration may allow devices and/or operators in the casino 705 to communicate with and/or control devices in other casinos. In some such implementations, a server in the computer room 720 may control devices in the casino 705 and devices in other gaming establishments. Conversely, devices and/or operators in another gaming establishment may communicate with and/or control devices in the casino 705.

For example, a server of the casino 705 or the central system 763 may be provisioned with relatively more advanced software (e.g., 3-D facial recognition software) for patron identification than servers of other networked locations. Such a server may process patron identification requests from devices in the casino 705 as well as patron identification requests from devices in the gaming establishments 793 and 795.

Here, gaming establishment 797 is configured for communication with the central system 763, but is not configured for communication with other gaming establishments. Some gaming establishments (not shown) may not be in communication with other gaming establishments or with a central system. The gaming establishment 705 includes multiple gaming machines 721, each of which is part of a bank 710 of gaming machines. In this example, the gaming establishment 705 also includes a bank of networked gaming tables 753. However, the present disclosure may be implemented in gaming establishments having any number of gaming machines, gaming tables, etc. It will be appreciated that many gaming establishments include hundreds or even thousands of gaming machines and/or gaming tables, not all of which are necessarily included in a bank and some of which may not be connected to a network. At least some of the gaming machines 721 and/or mobile devices 770 may be "thin clients" that are configured to perform client-side methods as described elsewhere herein.

Some configurations can provide automated, multi-player roulette, blackjack, baccarat, and other table games. The table games may be conducted by a dealer and/or by using some form of automation, which may include an automated roulette wheel, an electronic representation of a dealer, etc. In some such implementations, devices such as cameras, radio frequency identification devices, etc., may be used to identify and/or track playing cards, chips, etc. Some of the gaming tables 753 may be configured for communication with individual player terminals (not shown), which may be configured to accept bets, present an electronic representation of a dealer, indicate game outcomes, etc.

The gaming establishment 705 also includes networked kiosks 777. Depending on the implementation, kiosks 777 may be used for various purposes, including but not limited to cashing out, prize redemption, redeeming points from a player loyalty program, redeeming "cashless" indicia such as bonus tickets, smart cards, etc. In some implementations, the kiosks 777 may be used for obtaining information about the gaming establishment, e.g., regarding scheduled events (such as tournaments, entertainment, etc.), regarding a patron's location, etc. Software related to such features may be provided and/or controlled, and related data may be obtained and/or provided, according to the present disclosure. For example, in some implementations of the disclosure, the kiosks 777 may be configured to receive information from a patron, e.g., by presenting graphical user interfaces.

In this example, each bank 710 has a corresponding switch 715, which may be a conventional bank switch in some implementations. Each switch 715 is configured for communication with one or more devices in the computer room 720 via main network device 725, which combines switching and routing functionality in this example. Although various communication protocols may be used, some preferred implementations use the Gaming Standards Association's G2S Message Protocol. Other implementations may use the open, Ethernet-based SuperSAS® protocol, which is available from IGT. Still other protocols, including but not limited to Best of Breed ("BOB"), may be used to implement various embodiments of the disclosure. IGT has also developed a gaming-industry-specific transport layer called CASH that rides on top of TCP/IP and offers additional functionality and security.

Here, the gaming establishment 705 also includes an RFID network, implemented in part by RFID switches 719 and multiple RFID readers 717. An RFID network may be used, for example, to track objects (such as the mobile gaming devices 770, which include RFID tags 727 in this example), patrons, etc., in the vicinity of gaming establishment 705.

As noted elsewhere herein, some implementations of the disclosure may involve "smart" player loyalty instruments, such as player tracking cards, which include an RFID tag. Accordingly, the location of such RFID-enabled player loyalty instruments may be tracked via the RFID network. In this example, at least some of the mobile devices 770 may include an RFID tag 727, which includes encoded identification information for the mobile device 770. Accordingly, the locations of such tagged mobile devices 770 may be tracked via the RFID network in the gaming establishment 705. Other location-detection devices and systems, such as the global positioning system ("GPS"), may be used to monitor the location of people and/or devices in the vicinity of the gaming establishment 705 or elsewhere.

Various alternative network topologies can be used to implement different embodiments of the disclosure and/or to accommodate varying numbers of networked devices. For example, gaming establishments with large numbers of gaming machines 721 may require multiple instances of some network devices (e.g., of the main network device 725, which combines switching and routing functionality in this example) and/or the inclusion of other network devices not shown in FIG. 7. Some implementations of the disclosure may include one or more middleware servers disposed between the kiosks 777, the RFID switches 719 and/or the bank switches 715 and one or more devices in the computer room 720 (e.g., a corresponding server). Such middleware servers can provide various useful functions, including but not limited to the filtering and/or aggregation of data received from switches, from individual gaming machines and from other devices. Some implementations of the disclosure include load-balancing methods and devices for managing network traffic.

Storage devices 711, Sb™ server 730, License Manager 731, Arbiter 733, servers 732, 734, 736 and 738, host device (s) 760 and the main network device 725 are disposed within the computer room 720 of the gaming establishment 705. In practice, more or fewer devices may be used. Depending on the implementation, some such devices may reside in the gaming establishment 705 or elsewhere.

One or more devices in the central system 763 may also be configured to perform, at least in part, tasks specific to the present disclosure. For example, one or more servers 762, the arbiter 733, storage devices 764 and/or host devices 760 of the central system 763 may be configured to implement the functions described in detail elsewhere herein. These functions may include, but are not limited to, providing functionality for devices such as the wager gaming machines 721, the mobile devices 770, etc.

One or more of the servers of the computer room 720 may be configured with software for receiving a player's wager gaming notification parameters, determining when a wagering condition corresponds with the wager gaming notification parameters and/or providing a notification to the player when the wagering condition corresponds with the wager gaming notification parameters. Moreover, one or more of the servers may be configured to receive, process and/or provide image data from cameras 709, to provide navigation data to patrons (e.g., to indicate the location of and/or directions to a gaming table, a wager gaming machine, etc., associated with a wager gaming notification), etc.

For example, navigation data (which may include map data, casino layout data, camera image data, etc.) may be provided by one or more of the servers of the computer room 720 to the mobile devices 770. Some implementations of the present disclosure include a plurality of networked cameras 709, which may be video cameras, smart cameras, digital still cameras, etc. In some such implementations, such cameras may provide, at least in part, real-time navigation.

Other devices that may be deployed in the network 705 do not appear in FIG. 7. For example, some gaming networks may include not only various radio frequency identification ("RFID") readers 717, but also RFID switches, middleware servers, etc., some of which are not depicted in FIG. 7. These features may provide various functions. For example, a server (or another device) may determine a location of the mobile device 770 according to the location of an RFID reader that reads the RFID tag 727.

The servers and other devices indicated in FIG. 7 may be configured for communication with other devices in or outside of the gaming establishment 705, such as the host devices 760, the kiosks 777 and/or the mobile devices 770, for implementing some methods described elsewhere herein. Servers (or the like) may facilitate communications with such devices, receive and store patron data, provide appropriate responses, etc., as described elsewhere herein.

Some of these servers may be configured to perform tasks relating to accounting, player loyalty, bonusing/progressives, configuration of gaming machines, etc. One or more such devices may be used to implement a casino management system, such as the IGT Advantage™ Casino System suite of applications, which provides instantaneous information that may be used for decision-making by casino managers. A Radius server and/or a DHCP server may also be configured for communication with the gaming network. Some implementations of the disclosure provide one or more of these servers in the form of blade servers.

Some embodiments of the Sb™ server 730 and the other servers shown in FIG. 7 include (or are at least in communication with) clustered CPUs, redundant storage devices, including backup storage devices, switches, etc. Such storage devices may include a "RAID" (originally redundant array of inexpensive disks, now also known as redundant array of independent disks) array, back-up hard drives and/or tape drives, etc.

In some implementations of the disclosure, many of these devices (including but not limited to the License Manager 731, the servers 732, 734, 736, and 738, and the main network device 725) are mounted in a single rack with the Sb™ server 730. Accordingly, many or all such devices will sometimes be referenced in the aggregate as a "Sb™ server." However, in alternative implementations, one or more of these devices is in communication with the Sb™ server 730 and/or other devices of the network but located elsewhere. For example, some of the devices could be mounted in separate racks within the computer room 720 or located elsewhere on the network. Moreover, it can be advantageous to store large volumes of data elsewhere via a storage area network ("SAN").

The computer room 720 may include one or more operator consoles or other host devices that are configured for communication with other devices within and outside of the computer room 720. Such host devices may be provided with software, hardware and/or firmware for implementing various embodiments of the disclosure. However, such host devices need not be located within the computer room 720. The wired host devices 760 (which are desktop and laptop computers in this example) and the wireless devices 770 (which are mobile computing devices in this example) may be located elsewhere in the gaming establishment 705 or at a remote location.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. An electronic gaming machine comprising:

an input device configured to receive an indication of value for play of a wager-based game in which one or more game outcomes can be provided responsive to a wager;

an output device configured to output an indication of value in association with play of the wager-based game;

a display configured to display data associated with the wager-based game;

a network interface configured to communicate with a remote host;

one or more processors configured to:

detect whether a primary portable storage device is in communication with the electronic gaming machine, the primary portable storage device configured to store a boot image, the boot image including:

boot code having instructions for execution by the one or more processors when the electronic gaming machine is powered up, an operating system having software instructions for managing hardware and executing software applications at the electronic gaming machine, the operating system being approved by a regulatory gaming authority, and a framework application configured to search for local and external storage devices to locate and execute a pluggable module according to instructions provided by the pluggable module, the framework application including instructions configured to:

identify one or more portable storage devices other than the primary portable storage device, wherein the one or more storage devices is configured to store one or more pluggable modules, wherein the one or more pluggable modules includes instructions for at least one of installing software on the electronic gaming machine, executing a diagnostic on the electronic gaming machine, and executing a verification check of the content on the electronic gaming machine;

determine whether at least one of the one or more pluggable modules includes a signature, the signature indicating that a pluggable module is operable within the framework application and approved by the regulatory gaming authority, and execute the at least one pluggable module according to instructions provided by the at least one pluggable module when it is determined that the at least one pluggable module includes the signature; and the one or more processors further configured to:

determine whether the boot image is a signed image, the signed image being required by the regulatory gaming authority to establish a chain of trust, execute the framework application on the primary portable storage device when it is determined that the boot image is a signed image, locate a secondary storage device of the one or more portable storage devices, the secondary storage device having a plurality of pluggable modules stored thereon, present a user a listing of the plurality of pluggable modules on the display, and execute, at the gaming machine, a pluggable module selected by the user from the listing.

2. The electronic gaming machine of claim 1, wherein the boot image is required to be signed and approved by the regulatory gaming authority to modify the boot image.

3. The electronic gaming machine of claim 1, wherein the boot image requires a new signature and approval by the regulatory gaming authority when the operating system is modified.

4. The electronic gaming machine of claim 1, wherein the boot image requires a new signature and approval by the regulatory gaming authority when the framework application is modified.

5. The electronic gaming machine of claim 1, wherein the framework application is further configured to select a pluggable module based on a parameter including a jurisdiction parameter, an electronic gaming machine platform parameter or a user-defined configuration parameter.

6. The electronic gaming machine of claim 1, wherein the selection list is further updated when a new pluggable module is detected at one or more portable storage devices.

7. The electronic gaming machine of claim 1, wherein the framework application is further configured to load the pluggable module onto the primary portable storage device.

8. The electronic gaming machine of claim 1, wherein one or more processors are further configured to track information of one or more pluggable modules executed on the electronic gaming machine and store the information on a memory of the electronic gaming machine.

9. A method comprising:

detecting whether a primary portable storage device is in communication with an electronic gaming machine, the electronic gaming machine including an input device to receive an indication of value for play of a wager-based game in which one or more game outcomes can be provided responsive to a wager, an output device to output an indication of value in association with play of the wager-based game, a display to display data associated with the wager-based game, and the primary portable storage device including a boot image, the boot image including a boot code having instructions for execution by one or more processors when the electronic gaming machine is powered up, an operating system having software instructions for managing hardware and executing software application at the electronic gaming machine, the operating system being approved by a regulatory gaming authority, and a framework application to execute a pluggable module according to instructions provided by the pluggable module;

determining whether the boot image is a signed image, the signed image being required by the regulatory gaming authority to establish a chain of trust;

executing the framework application on the primary portable storage device when it is determined that the boot image is a signed image, wherein the framework application is configured to search for local and external storage devices to locate pluggable programming modules;

identifying, via the framework application, one or more portable storage devices other than the primary portable storage device which stores one or more pluggable modules;

determining, via the framework application, whether at least one of the one or more pluggable modules includes a signature, the signature indicating that a pluggable module is operable within the framework application and approved by the regulatory gaming authority;

presenting, via the display, a listing of the one or more pluggable modules to a user of the gaming machine;

receiving a selection of a pluggable module of the one or more pluggable modules of the listing; and executing, via the framework application, the selected pluggable module according to instructions provided by the at least one pluggable module when it is determined that the pluggable module includes the signature, wherein the pluggable module includes instructions for at least one of installing software on an electronic gaming machine, executing a diagnostic on the electronic gaming machine and executing a verification check of the content on the electronic gaming machine.

10. The method recited in claim 9, wherein the boot image is required to be signed and approved by the regulatory gaming authority to modify the boot image.

11. The method recited in claim 9, wherein the one or more portable storage devices is at least one of a storage device of the electronic gaming machine, a secondary portable device and a remote host.

12. The method recited in claim 9, further comprising:

selecting, via the framework application, a pluggable module based on a parameter including a jurisdiction parameter, an electronic gaming machine platform parameter or a user-defined configuration parameter.

13. The method recited in claim 9, wherein the one or more pluggable modules are modified independently of the boot image.

14. A gaming system comprising:

a primary storage device configured to store a boot image, the boot image including:

a boot code having instructions for execution by one or more processors when an electronic gaming machine is powered up, an operating system having software instructions for managing hardware and executing software applications at the electronic gaming machine, the operating system being approved by a regulatory gaming authority, and a framework application configured to search for local and external storage devices to locate and execute a pluggable module according to instructions provided by the pluggable module, the framework application including instructions configured to:

identify one or more storage devices other than the primary portable storage device, wherein the one or more storage devices is configured to store one or more pluggable modules, determine whether at least one of the one or more pluggable modules includes a signature, the signature indicating that a pluggable module is operable within the framework application and approved by the regulatory gaming authority, and execute the at least one pluggable module according to instructions provided by the at least one pluggable module when it is determined that the at least one pluggable module includes the signature, wherein the pluggable module includes instructions for at least one of installing software on an electronic gaming machine, executing a diagnostic on the electronic gaming machine and executing a verification check of the content on the electronic gaming machine;

an electronic gaming machine including:

an input device configured to receive an indication of value for play of a wager-based game in which one or more game outcomes can be provided responsive to a wager, an output device configured to output an indication of value in association with play of the wager-based game, a display configured to display data associated with the wager-based game, a network interface configured to communicate with one or more remote hosts, and one or more processors configured to:

detect whether the primary portable storage device is in communication with the one or more electronic gaming machines, determine whether the boot image is a signed image, the signed image being required by the regulatory gaming authority to establish a chain of trust, execute the framework application on the primary portable storage device when it is determined that the boot image is a signed image, locate a remote host of the one or more remote hosts having a plurality of pluggable modules stored thereon, present a user a listing of the plurality of pluggable modules on the display, and execute, at the gaming machine, a pluggable module selected by the user from the listing;

the one or more remote hosts configured to store one or more pluggable modules; and a network configured to provide communication among the electronic gaming machine and the one or more remote hosts via the network interface.

15. The gaming system recited in claim 14, wherein the one or more pluggable modules are modified independently of the boot image.

16. The gaming system recited in claim 14, wherein the one or more pluggable modules are modified independently of a different pluggable module.

* * * * *